(12) United States Patent
Fang

(10) Patent No.: US 6,628,311 B1
(45) Date of Patent: Sep. 30, 2003

(54) GRAPHICAL USER INTERFACE INCLUDING HYPERLINKS IN A HELP MESSAGE DIALOG BOX

(75) Inventor: Chi Fang, Union City, CA (US)

(73) Assignee: Ricoh Company, LTD, Tokyo (JP)

( * ) Notice: Subject to any disclaimer, the term of this patent is extended or adjusted under 35 U.S.C. 154(b) by 0 days.

(21) Appl. No.: 09/497,155

(22) Filed: Feb. 3, 2000

(51) Int. Cl.[7] .................................................. G09G 5/00
(52) U.S. Cl. ...................... 345/777; 345/715; 345/804; 345/709
(58) Field of Search ................................ 345/715, 708, 345/709, 710, 711, 712, 714, 771, 777, 804, 808

(56) References Cited

U.S. PATENT DOCUMENTS

| | | | | |
|---|---|---|---|---|
| 5,481,667 A | * | 1/1996 | Bieniek et al. | 345/709 |
| 5,488,685 A | * | 1/1996 | Palmer et al. | 345/473 |
| 6,002,398 A | * | 12/1999 | Wilson | 345/777 |
| 6,078,326 A | * | 6/2000 | Kilmer et al. | 345/834 |
| 6,133,917 A | * | 10/2000 | Feigner et al. | 345/708 |
| 6,259,445 B1 | * | 7/2001 | Hennum et al. | 345/708 |
| 6,342,907 B1 | * | 1/2002 | Petty et al. | 345/708 |
| 6,542,163 B2 | * | 4/2003 | Gorbet et al. | 345/711 |

OTHER PUBLICATIONS

Borland, Russel, Microsoft Windows 98 Official Preview Kit, 1997, Microsoft Press, p. 55–57, 81–83.*
Microsoft Windows 98, © 1998.*

* cited by examiner

*Primary Examiner*—John Cabeca
*Assistant Examiner*—Shawn Becker
(74) *Attorney, Agent, or Firm*—Oblon, Spivak, McClelland, Maier & Neustadt, P.C.

(57) ABSTRACT

A graphical user interface including hyperlinked help messages embedded within a help dialog. When the hyperlink help message is selected, a computer program product which selects an appropriate tab is executed. The respective tab corresponds to a possible reason why the deactivated display control is deactivated. The computer program product also highlights a respective display control included in the selected tab, which corresponds to the possible reason why the deactivated display control is deactivated.

17 Claims, 8 Drawing Sheets

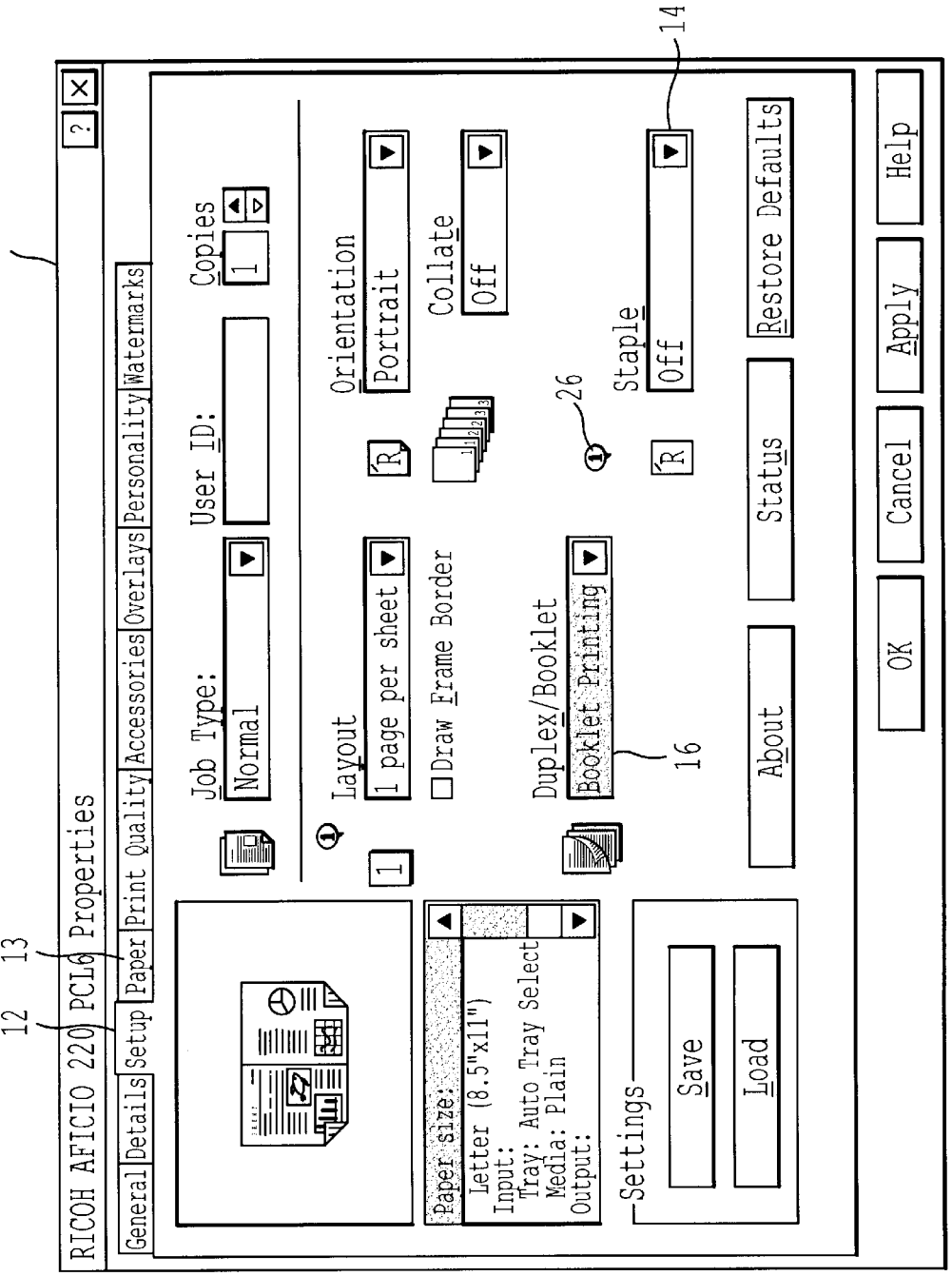
FIG. 2α
(PRIOR ART)

GRAPHICAL USER INTERFACE INCLUDING HYPERLINKS IN A HELP MESSAGE DIALOG BOX

BACKGROUND OF THE INVENTION

1. Field of the Invention

The present invention relates to a Graphical User Interface (GUI) in which embedded hyperlinks are introduced in help message dialog boxes. The hyperlinks associate message contents in the help message dialog box with related display controls in the GUI, so that when a specific message is selected, the GUI automatically identifies an appropriate properties tab and display the related control(s).

2. Discussion of the Background

Generally, an auxiliary device (such as a printer, scanner, etc.) provides a user with multiple options to meet specific demands, and includes a GUI to provide a convenient way for the user to access and control the auxiliary device.

For example, FIG. 1 illustrates a GUI for controlling a printer. The GUI includes a printer properties dialog 10 having tabs 9. The tabs 9 include, for example, a Setup tab 12 having several display controls, such as a Duplex/Booklet display control 16 and a Staple display control 14. Thus, using the Duplex/Booklet display control 16 and the Staple display control 14, a user may "set up" a print job to include "Side Binding" and a "Left Slant" staple (for example, see the setup display region 5 which illustrates these features). Also shown are an OK push button 18, Cancel push button 20, Apply push button 22, and Help push button 24. The purpose of these push buttons are generally well-known and a description will therefore be omitted.

In addition, interdependencies generally exist among different display controls, which make certain display controls become unavailable to a user under certain conditions. For example, as shown in FIG. 2a, if the Duplex/Booklet display control 16 is set to "Booklet Printing" rather than "Side Binding," the Staple display control 14 becomes unavailable to the user, because the use of a staple is not compatible with booklet printing. To communicate this to the user, the respective display control is deactivated (for example, see the Staple display control 14 in FIG. 2a). A help icon 26 (which may be displayed as a balloon-shaped help sign) is also displayed near the deactivated display control. Thus, the user may select the help icon 26 to retrieve information about the deactivated Staple display control 14.

FIG. 2b illustrates a help message dialog box 30, which is displayed when the help icon 26 is selected. The help message dialog box 30 includes help information 34 explaining why the Staple display control 14 is deactivated. Thus, by referring to the help information 34, the user may realize the staple display control 14 is deactivated because the Duplex/Booklet display control 16 was changed from "Side Binding" to "Booklet Printing," for example. That is, item four in the help information 34 states that the staple is available when booklet printing is not selected. Thus, the user may change the Duplex/Booklet display control 16 back to "Side Binding" and then configure the Staple display control 14. The user may then close the help message dialog box 30 by selecting the OK push button 36 or Cancel push button 38.

In some instances, a user's selection of a display control in one GUI tab may deactivate a display control in another GUI tab. For example, item three of the help information 34 indicates the staple feature is available when the bypass tray is not selected as an input tray in the Paper tab 13 (see FIG. 2a). The user may then select the Paper tab 13 and determine if the bypass tray has been selected.

This is a very tedious operation and requires several steps, and the user is required to have a general knowledge of the different tabs associated with a printer properties dialog. Further, the user is prevented from selecting another tab of the printer properties dialog 10 until the help message dialog box 30 is closed (e.g., by selecting the OK push button 36 or Cancel push button 38). Thus, many situations occur in which the user closes the help message dialog box 30, selects another tab (Such as the Paper tab 13), but forgets which display control in the Paper tab 13 was identified in the help information 34 (e.g., bypass tray). In addition, there may be more than one reason why the staple display control 14 is deactivated (such as items one through four shown in the help information 34). Therefore, a user may have to repeat the above steps several times to accurately determine all of the reasons why the staple display control is deactivated.

In summary, the user is required to perform at least the following steps to determine why a particular display control is deactivated: 1) select the help icon 26 to display the help message dialog box 30; 2) determine from the help information 34 where the related display control is located in the multiple printer driver tabs; 3) select the OK push button 36 or Cancel push button 38 to close the help message dialog box 30; 4) select the identified tab, check the value of the related display control and make changes if needed; and 5) repeat the above steps if still more related controls need to be checked. Obviously, this is a very tedious and time consuming process.

SUMMARY OF THE INVENTION

Accordingly, one object of the present invention is to solve the above-noted in-efficiency in using the Help dialog box.

Another object of the present invention is to provide a novel Graphical User Interface (GUI) which includes embedded hyperlink help messages in a help message dialog box. The hyperlink help messages display information about why a display control may be deactivated, and when selected, automatically identify an appropriate GUI tab and display controls that are related to the deactivated display control.

Yet another object of the present invention is to keep the help message dialog box of the GUI active on the desk top, so that the user can easily return back to the help message dialog box and examine and/or select other embedded hyperlink messages that are related to the deactivated control.

To achieve these and other objects, the present invention provides a novel graphical user interface that includes hyperlinked help messages embedded within a help dialog. When a hyperlinked help message is selected, a computer program is executed which selects an appropriate tab to display the related control(s). The executed computer program also highlights a respective display control in the selected tab, that corresponds to the possible reason why the deactivated display control is deactivated.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2a illustrates the printer properties dialog shown in FIG. 1 with the Duplex/Booklet display control configured for booklet printing and the Staple display control deactivated;

DESCRIPTION OF THE PREFERRED EMBODIMENTS

Figure 1:
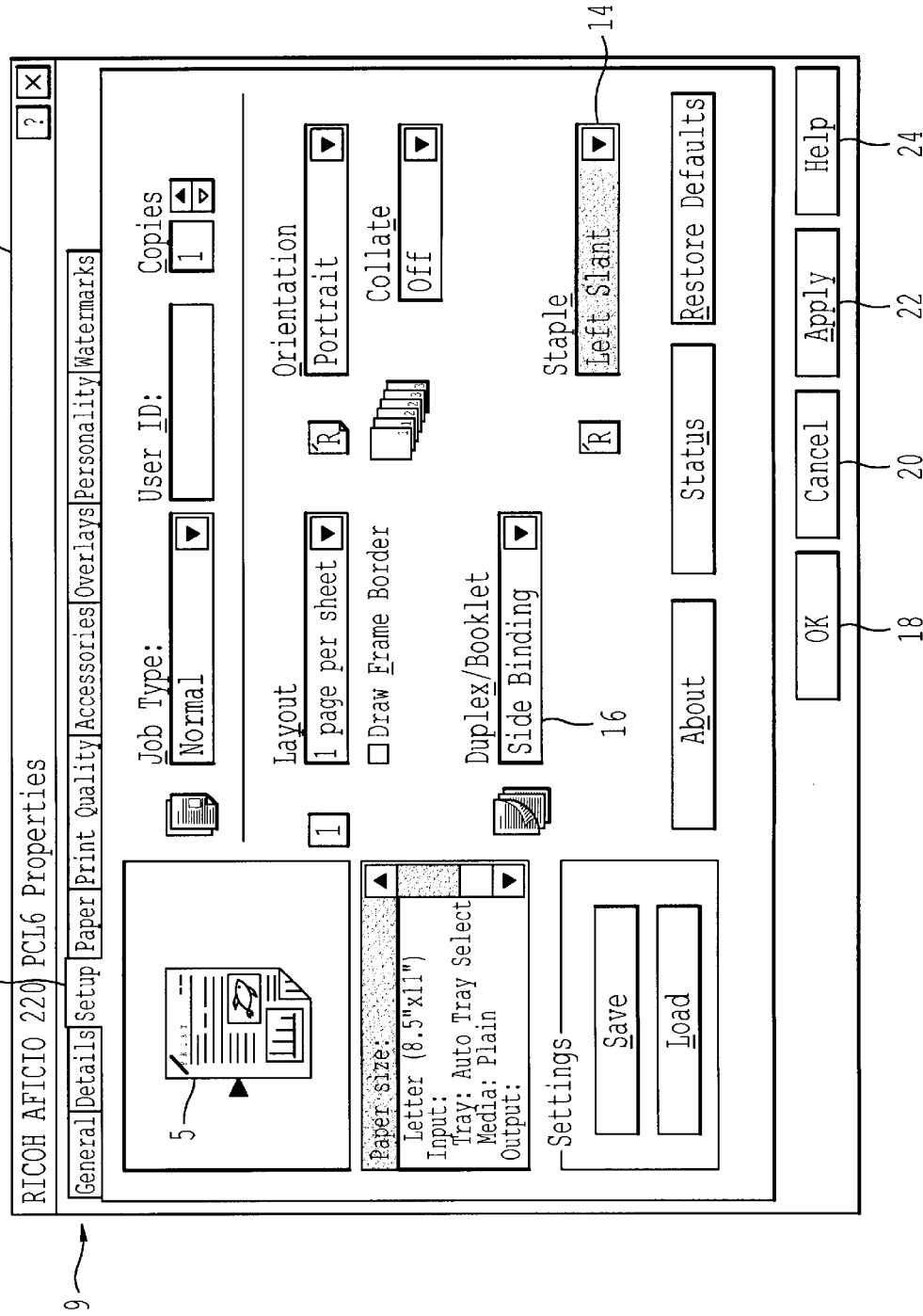
FIG. 1 illustrates a printer properties dialog for a RICOH AFICIO 220 PCL 6 printer with the "setup" Tab as the currently active Tab.
Figure 2B:
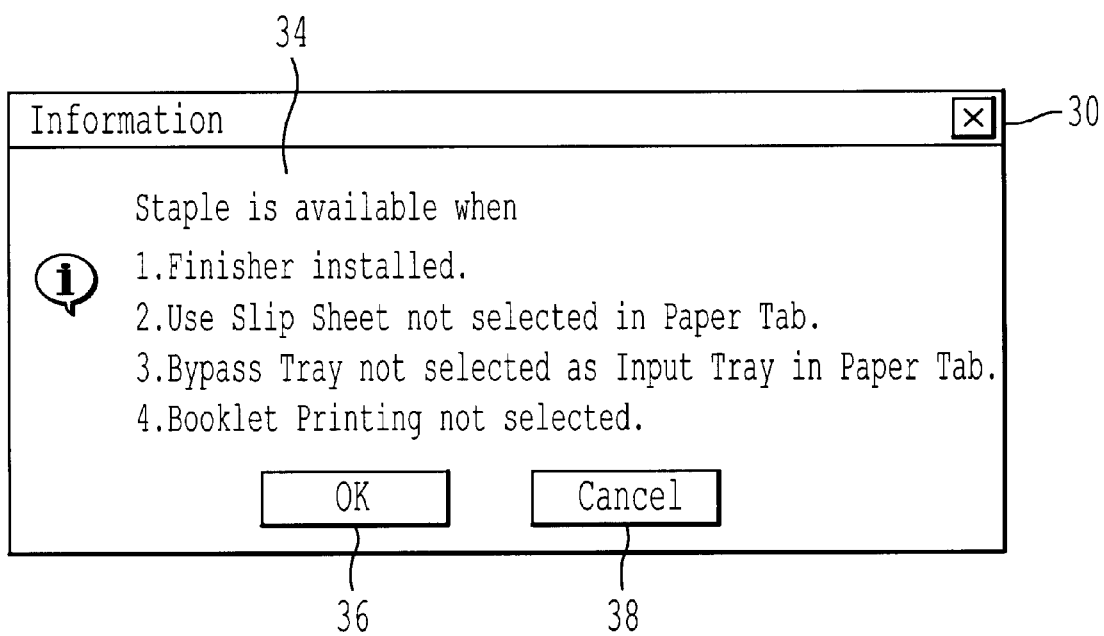
FIG. 2b illustrates a help message dialog box that is displayed when a help icon corresponding to a deactivated display control is selected.
Figure 3A:
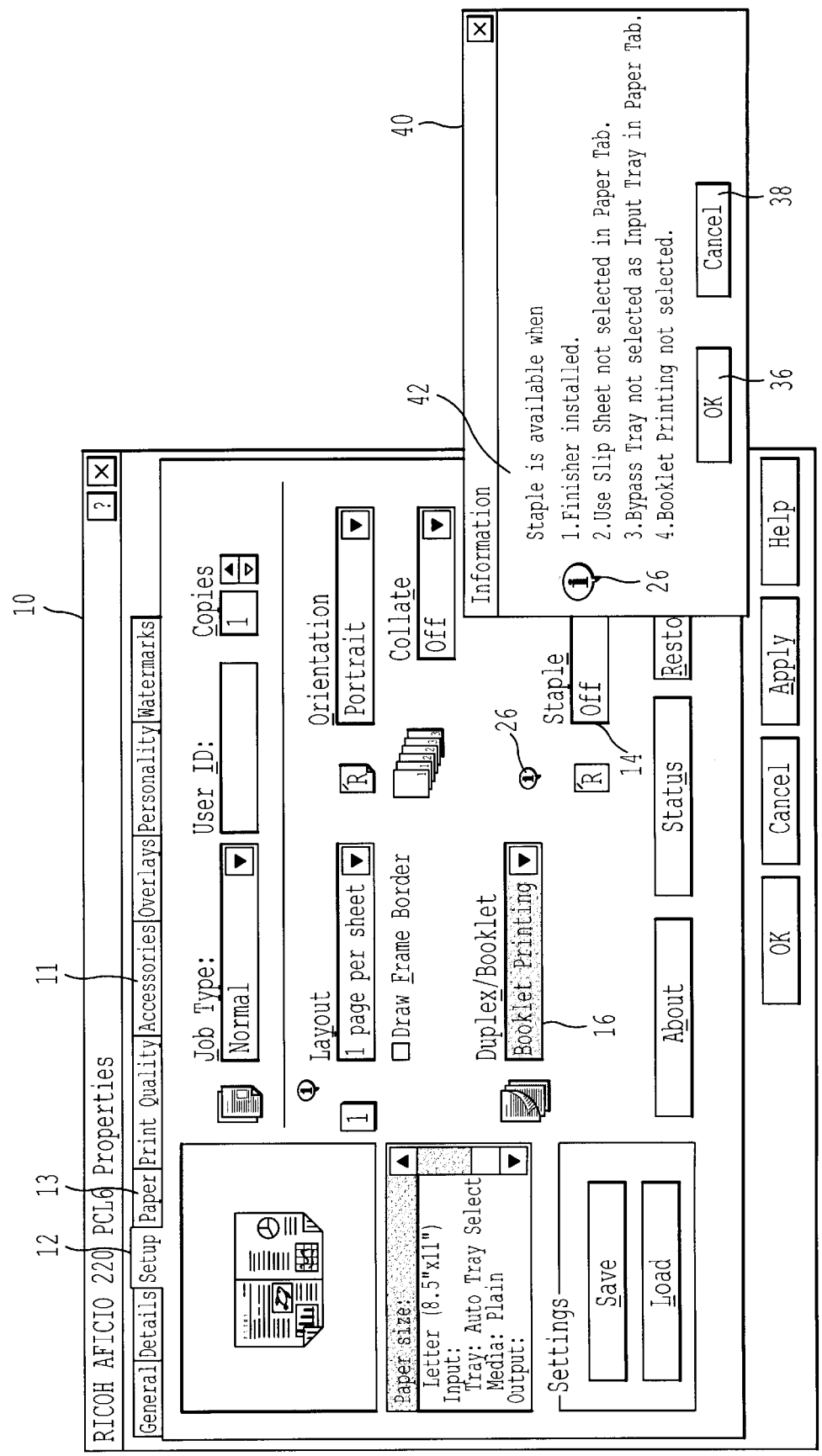
FIG. 3a illustrates a printer properties dialog and the related help message dialog box that pops Lip when the help icon is clicked. This help message dialog box includes embedded hyperlink help messages according to the present invention.

Referring now to the drawings, wherein like reference numerals designate identical or corresponding parts throughout the several views, FIG. 3a illustrates the printer properties dialog 10 after the help icon 26 corresponding to the Staple display control 14 is selected. In addition, the Duplex/Booklet display control 16 is configured for "Booklet Printing" and the staple display control 14 is thus deactivated. Also shown in FIG. 3a is a help message dialog box 40 including embedded hyperlink help messages 42. The help message dialog box 40 is displayed when the help icon 26 is selected.

Figure 3B:
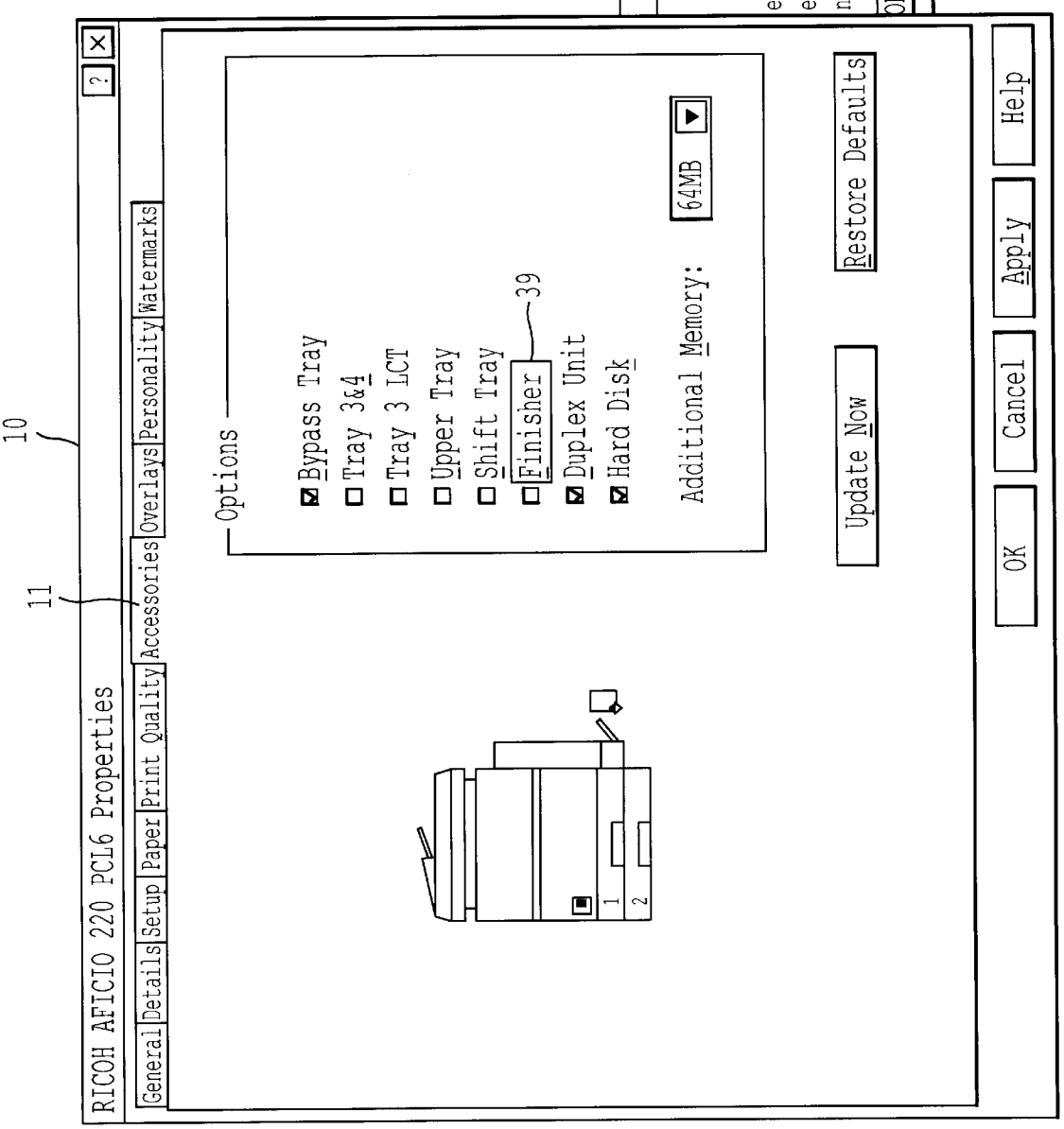
FIG. 3b illustrates an example of the printer properties dialog shown in FIG. 3a when a hyperlink message, in this case, "Finisher Installed" is selected from the help message dialog box.

The hyperlink help messages 42 shown in FIG. 3a include four items: 1) Finisher installed, 2) Use Slip Sheet not selected in Paper Tab, 3) Bypass Tray not selected as Input Tray in Paper Tab, and 4) Booklet Printing not selected. Each of these items includes a "highlighted" term. For example, in item one, the term "Finisher" is highlighted. The highlighted term (or terms) correspond to a hyperlink, which when selected, executes a computer program for identifying the appropriate tab and display control(s) corresponding to the deactivated display control. If the user selects item one, (i.e., "Finisher installed") by selecting the highlighted term "Finisher," the embedded hyperlink executes a computer program which displays the Accessories tab 11 and highlights a Finisher check box 39 (see FIG. 3b). Thus, the user can determine that the finisher is not selected, which is one reason why the staple is not available. If the user wishes to use the stapling feature, the user may select the Finisher display control 39.

Figure 3C:
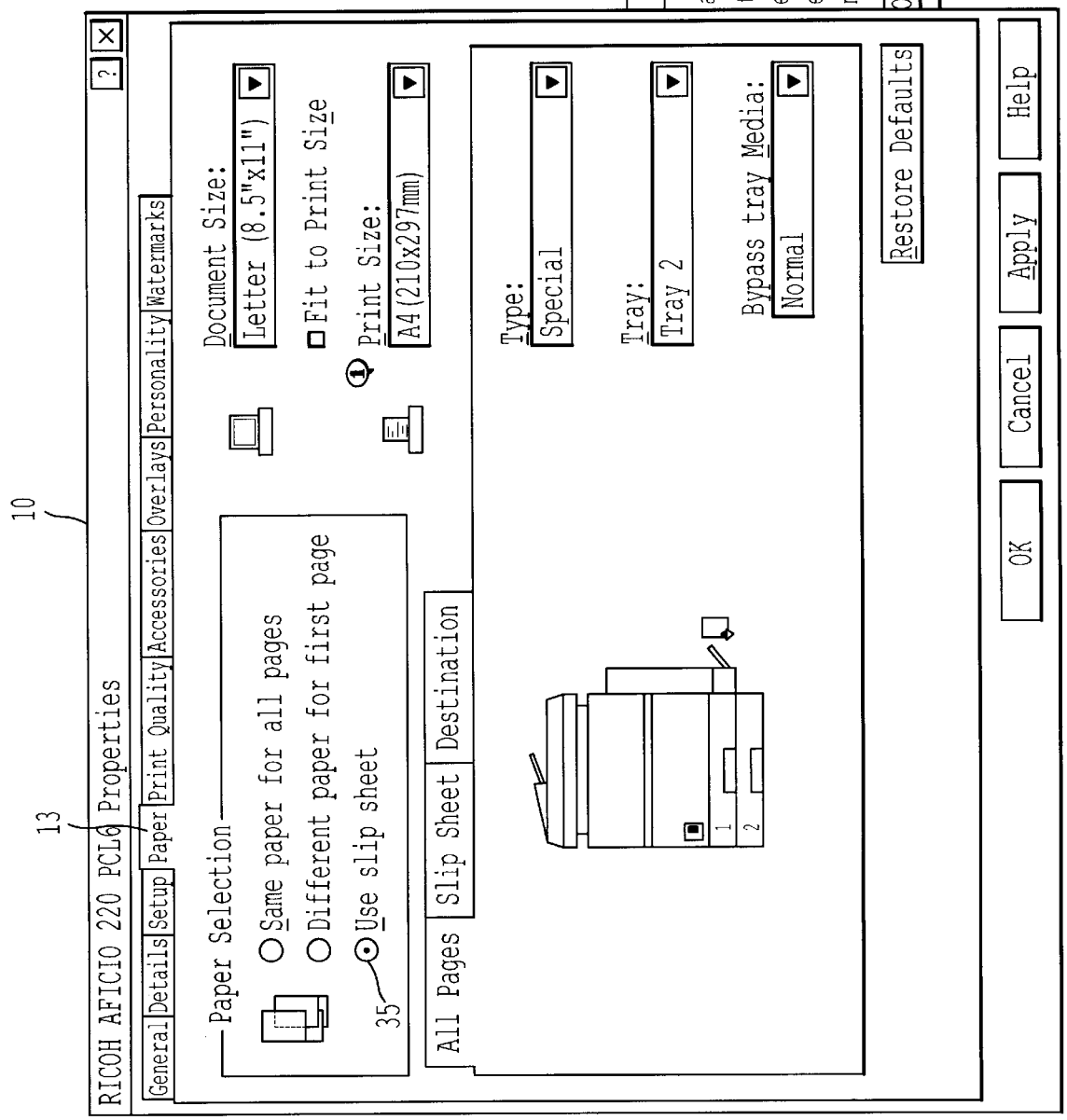
FIG. 3c illustrates an example of the printer properties dialog shown in FIG. 3a when another hyperlink message, in this case, the second message is selected from the help message dialog box.

After inspecting and possibly changing the Finisher display control 39, the user may select the OK push button 36 or Cancel push button 38 to close the help message dialog box 40. Alternatively, the user may select another item in the help message dialog box 40 (i.e., by not selecting the OK push button 36 or cancel push button 38). For example, the user may select item two (i.e., "Use Slip Sheet not selected in Paper Tab"), by selecting the highlighted terms "Use Slip Sheet," the embedded hyperlink executes a computer program which activates the Paper tab 13 shown in FIG. 3c. In addition, as shown in FIG. 3c, the "Use slip sheet" display control 35 is highlighted. Thus, the user may conveniently inspect and change the setting related to the Use slip sheet display control 35. The user may continue through this process to easily inspect or change, if necessary, the several related display controls in various tabs to determine why a particular display control is deactivated.

In addition, the above descriptions with reference to FIGS. 2a–2b and 3a–3c correspond to a graphical user interface for a printer driver. However, the present invention is not limited to a printer driver GUI. That is, the present invention also relates to a GUI for a scanner driver, facsimile driver, or a general computer application.

Figure 4:
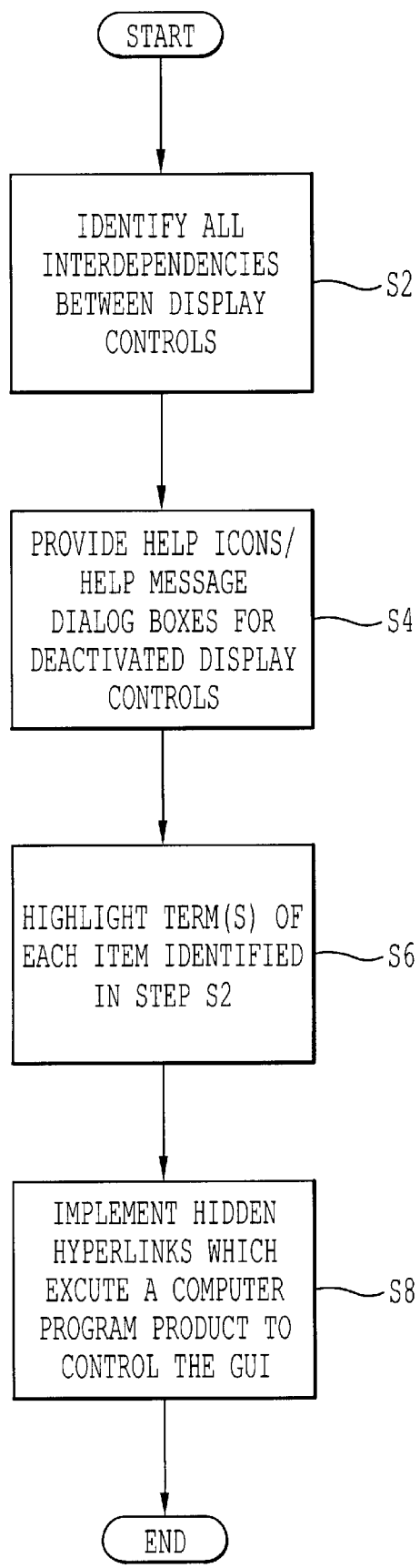
FIG. 4 is a flowchart illustrating steps for developing the GUI and a corresponding computer program according to the present invention.

FIG. 4 illustrates the steps of developing a printer driver GUI according to the present invention. First, all of the interdependencies between display controls are identified (step S2). For example, one interdependency exists between the Duplex/Booklet display control 16 and Staple display control 14 as discussed above. After all of the interdependencies are identified, a help icon and corresponding help message dialog box are provided for each deactivated display control (step S4). As discussed above, each help message dialog box includes help information (e.g., items 1–4 shown in FIG. 3a) corresponding to possible reasons why a particular display control is deactivated. At least one term of each item is highlighted to inform the user that a hyperlink exists for this term (step S6). Then, hidden hyperlinks are implemented for each highlighted term. The hyperlink executes a computer program to control the graphic user interface.

The computer program is a program (such as one developed using C, C++) which handles the click message and in response displays the appropriate tab and highlights the appropriate display control related to the deactivated display control. For example, in an X-windows environment, OSF/Motiff is a programming package which may be used to develop a graphical user interface. Within OSF/Motiff, there exists a plurality of push buttons, radio buttons, etc., which may be used to develop the GUI. The embedded hyperlink may be implemented by a hidden push button which when selected calls a computer program. The computer program is often referred to as a "message handling" routine. Thus, when the hyperlink is selected, the computer program is called. For example, in the case of the deactivated staple display control 14, and the selection of item I in the help message dialog box 40 (see FIGS. 3a and 3b), the computer program displays the accessories tab 11 and highlights the finisher check box 39.

Figure 5:
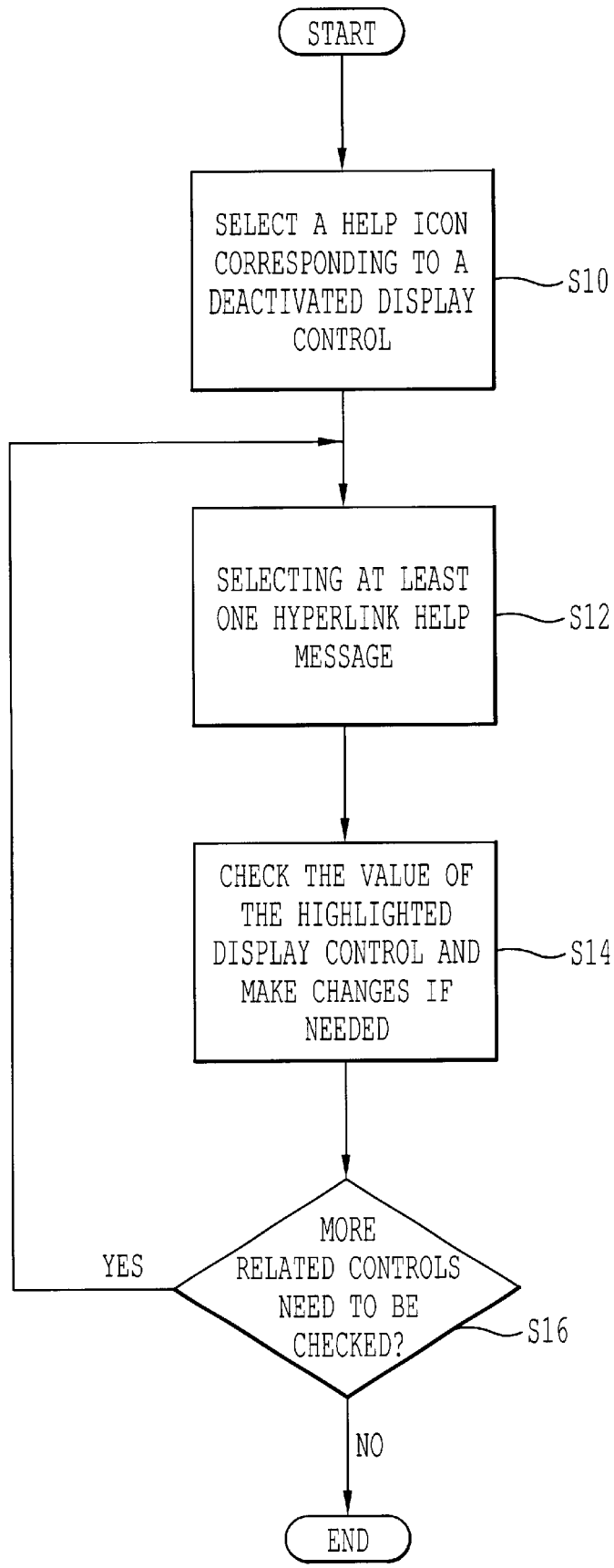
FIG. 5 is a flowchart illustrating a method of controlling an auxiliary device through a graphical user interface according to the present invention.

FIG. 5 is a flowchart illustrating a method of controlling an auxiliary device, such as a printer, through a graphical user interface according to the present invention. First, a user selects a help icon corresponding to a deactivated display control of the graphical user interface (step S10), and then selects a hyperlink help message included in a help dialog displayed when the help icon is selected (step S12). Then, the user may check the value of the highlighted display control and make changes if needed (step S14). If more related display controls need to be checked (yes in step S16), the user may repeat steps S12 and S14.

This invention may be conveniently implemented using a conventional general purpose digital computer or microprocessor programmed according to the specification of the present invention, as will be apparent to those skilled in computer programming. Appropriate software coding can readily be prepared by skilled programmers based on the teachings of the present disclosure, as will be apparent to those skilled in computer software. The invention may also be implemented by the preparation of application-specific integrated circuits or by interconnecting an appropriate network of conventional component circuits, as will be readily apparent to those skilled in the art.

The present invention includes a computer program which is a storage medium including instructions which can be used to program a computer to perform a process of the invention. The storage medium can include, but is not limited to, any type of disk including floppy disks, optical disks, CD-ROMs, and magneto-optical disks, ROMs, RAMs, EPROMs, EEPROMs, magnetic or optical cards, or any type of pure software inventions (e.g., word processing, accounting, Internet related, etc.) media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. A graphical user interface, comprising:
    a plurality of tabs contained within a same parent window, each tab including a plurality of display controls configured to provide a user with control options for controlling an auxiliary device, said plurality of display controls having interdependencies among different display controls; and
    a help icon corresponding to a deactivated display control of the plurality of display controls and configured to display a help dialog including a plurality of hyperlink help messages,
    wherein the plurality of hyperlink help messages are configured to execute a computer program product which selects a respective tab from the plurality of tabs contained with the same parent window when a corresponding hyperlink help message is selected, said respective tab including a display control corresponding to a possible reason why a deactivated display control is deactivated,
    wherein the computer program product automatically highlights said respective display control included in said respective tab corresponding to the possible reason why the deactivated display control is deactivated, and
    wherein the computer program product moves the respective tab including the respective display control in front of the other plurality of tabs when the respective tab including the respective display control is hidden from view by the other plurality of tabs such that the user may toggle between the plurality of tabs by selecting different hyperlink messages included in the plurality of hyperlink messages.

2. The graphical user interface according to claim 1, wherein the auxiliary device is one of a printer, a scanner, and a facsimile.

3. The graphical user interface according to claim 1, wherein the help dialog remains active until one of a CANCEL push button and an OK push button corresponding to the help dialog is selected.

4. The graphical user interface according to claim 1, wherein the help icon comprises a balloon-shape.

5. The graphical user interface according to claim 1, wherein the at least one hyperlink is at least one of 1) highlighted and 2) underlined.

6. The graphical user interface according to claim 1, wherein only the same parent window and the help dialog are displayed when each of the plurality of hyperlinks is selected.

7. A computer program product, comprising:
    a driver configured to control an auxiliary device; and
    a graphical user including:
        a plurality of tabs contained within a same parent window, each tab including a plurality of display controls configured to provide a user with control options for controlling the auxiliary device, said plurality of display controls having interdependencies among different display controls; and
        a help icon corresponding to a deactivated display control of the plurality of display controls and configured to display a help dialog including a plurality of hyperlink help messages,
    wherein the plurality of hyperlink help messages are configured to execute computer instructions for selecting a respective tab from the plurality of tabs contained within the same parent window when a corresponding hyperlink help message is selected, said respective tab including a display control corresponding to a possible reason why a deactivated display control is deactivated,
    wherein the corresponding hyperlink message is configured to execute computer instructions for automatically highlighting said respective display control included in the respective tab corresponding to the possible reason why the deactivated display control is deactivated, and
    wherein the corresponding hyperlink message is configured to execute computer instructions to move the respective tab including the respective display control in front of the other plurality of tabs when the respective tab including the respective display control is hidden from view by the other plurality of tabs such that the user may toggle between the plurality of tabs by selecting different hyperlink messages included in the plurality of hyperlink messages.

8. The computer program product according to claim 7, wherein the auxiliary device is one of a printer, a scanner and a facsimile.

9. The computer program product according to claim 7, wherein the help dialog remains active until one of a CANCEL push button and an OK push button corresponding to the help dialog is selected.

10. The computer program product according to claim 7, wherein the help icon comprises a balloon-shape.

11. The computer program product according to claim 7, wherein the at least one hyperlink is at least one of 1) highlighted and 2) underlined.

12. The computer program product according to claim 8, wherein only the same parent window and the help dialog are displayed when each of the plurality of hyperlinks is selected.

13. A method of controlling an auxiliary device through a graphical user interface, comprising the steps of:
    selecting a help icon corresponding to a deactivated display control of the graphical user interface, said graphical user interface including a plurality of tabs contained within a same parent window, each tab including a plurality of display controls configured to provide a user with control options for controlling an auxiliary device, said plurality of display controls having interdependencies among different display controls; and selecting a corresponding hyperlink help message from a plurality of hyperlink messages included in a help dialog displayed when the help icon is selected, wherein the plurality of hyperlink help messages are configured to execute a computer program product which selects a respective tab from the plurality of tabs contained within the same parent window, said respective tab including a display control corresponding to a possible reason why a deactivated display control is deactivated, wherein the computer program product automatically highlights said respective display control included in the respective tab corresponding to the possible reason why the deactivated display control is deactivated, and wherein the computer program product moves the respective tab including the respective display control in front of the other plurality of tabs when the respective tab including the respective display control is hidden from view by the other plurality of tabs such that the user may toggle between the plurality of tabs by selecting different hyperlink messages included in the plurality of hyperlink messages.

14. The method according to claim 13, wherein the auxiliary device is one of a printer, a scanner and a facsimile.

15. The method according to claim 13, wherein the help dialog remains active until one of a CANCEL push button and an OK push button corresponding to the help dialog is selected.

16. The method according to claim 13, wherein the at least one hyperlink is at least one of 1) highlighted and 2) underlined.

17. The method according to claim 15, wherein only the same parent window and the help dialog are displayed when each of the plurality of hyperlinks is selected.

* * * * *